US012623833B2

(12) United States Patent
Coles

(10) Patent No.: US 12,623,833 B2
(45) Date of Patent: May 12, 2026

(54) PROTECTIVE PACKAGING FOR ITEMS

(71) Applicant: Agile Box Ltd., Norfolk (GB)

(72) Inventor: Christopher Coles, Norfolk (GB)

(73) Assignee: Agile Box Ltd, Norfolk (GB)

( * ) Notice: Subject to any disclaimer, the term of this patent is extended or adjusted under 35 U.S.C. 154(b) by 0 days.

(21) Appl. No.: 18/720,178

(22) PCT Filed: Dec. 14, 2022

(86) PCT No.: PCT/EP2022/085979
§ 371 (c)(1),
(2) Date: Jun. 14, 2024

(87) PCT Pub. No.: WO2023/111094
PCT Pub. Date: Jun. 22, 2023

(65) Prior Publication Data

US 2025/0051090 A1 Feb. 13, 2025

(30) Foreign Application Priority Data

Dec. 15, 2021 (GB) ..................................... 2118170

(51) Int. Cl.
*B65D 85/32* (2006.01)
*B31B 50/26* (2017.01)
(Continued)

(52) U.S. Cl.
CPC ............ *B65D 85/325* (2013.01); *B31B 50/26* (2017.08); *B65D 5/18* (2013.01); *B65D 5/5026* (2013.01);
(Continued)

(58) Field of Classification Search
CPC ......... B31B 2100/0028; B31B 2110/35; B31B 50/26; B65D 5/18; B65D 5/20;
(Continued)

(56) References Cited

U.S. PATENT DOCUMENTS 705,286 A * 7/1902 Palmer et al. ....... B65D 85/325 217/27
1,940,292 A * 12/1933 Bueschel ............ B65D 85/325 229/122
(Continued)

FOREIGN PATENT DOCUMENTS

AT 11880 U1 * 6/2011 ........... B65D 85/325
CN 209757903 U * 12/2019 ............. B65D 85/32
(Continued)

*Primary Examiner* — Anthony D Stashick
*Assistant Examiner* — Marcos Javier Rodriguez Molina
(74) *Attorney, Agent, or Firm* — Young Basile Hanlon & MacFarlane, P.C.

(57) ABSTRACT

Protective packaging is described that includes a base having an outer and an inner base wall. A plurality of sidewalls extends from the outer base wall to define an internal volume and an opening. The internal volume is opposite the outer base wall. The inner base wall is disposed within the internal volume spaced apart from the outer base wall. A cover includes an outer cover wall and an inner cover wall. The cover is rotatably attached to at least one sidewall. The cover is rotatable between a closed position in which the cover closes the opening and an open position in which the cover does not close the opening. In the closed position, the inner cover wall is within the internal volume and spaced apart from the outer cover wall and the inner base wall. The inner base wall and the inner cover wall receive or house an item.

16 Claims, 5 Drawing Sheets

(51) Int. Cl.

| | |
|---|---|
| ***B31B 100/00*** | (2017.01) |
| ***B31B 110/35*** | (2017.01) |
| ***B65D 5/18*** | (2006.01) |
| ***B65D 5/50*** | (2006.01) |
| ***B65D 5/54*** | (2006.01) |
| ***B65D 81/07*** | (2006.01) |
| *B65D 5/20* | (2006.01) |
| *B65D 5/32* | (2006.01) |

(52) U.S. Cl.

CPC ............ *B65D 5/548* (2013.01); *B65D 81/07* (2013.01); *B31B 2100/0028* (2017.08); *B31B 2110/35* (2017.08)

(58) Field of Classification Search

CPC .... B65D 5/5004; B65D 5/5026; B65D 5/548; B65D 81/07; B65D 85/32; B65D 85/322; B65D 85/325; B65D 1/00; B65D 1/02; B65D 1/0207; B65D 1/0215; B65D 1/023; B65D 1/0238; B65D 1/0284; B65D 1/095; B65D 1/10; B65D 1/165; B65D 1/22; B65D 1/26; B65D 1/265; B65D 1/28; B65D 1/30; B65D 1/34; B65D 1/36; B65D 1/40; B65D 1/42; B65D 1/44; B65D 1/46; B65D 1/48; B65D 11/00; B65D 11/02; B65D 11/04; B65D 11/10; B65D 11/1833; B65D 11/1873; B65D 11/20; B65D 11/22; B65D 13/00; B65D 13/04; B65D 15/02; B65D 15/22; B65D 15/24; B65D 17/00; B65D 17/4011; B65D 17/4012; B65D 17/4014; B65D 19/00; B65D 19/0012; B65D 19/0026; B65D 19/0095; B65D 19/12; B65D 19/16; B65D 19/18; B65D 19/20; B65D 19/38; B65D 19/44; B65D 21/0201; B65D 21/0202; B65D 21/0204; B65D 21/0206; B65D 21/0209; B65D 21/0212; B65D 21/0215; B65D 21/0219; B65D 21/0223; B65D 21/0231; B65D 21/0233; B65D 21/08; B65D 21/083; B65D 21/086; B65D 2203/00; B65D 2203/02; B65D 2203/06; B65D 2203/10; B65D 2203/12; B65D 2205/00; B65D 2205/02; B65D 2207/00; B65D 2215/00; B65D 2215/02; B65D 2215/04; B65D 2215/08; B65D 2221/00; B65D 2251/0015; B65D 2251/0018; B65D 2251/0093; B65D 2251/023; B65D 2251/105; B65D 23/00; B65D 23/02; B65D 23/08; B65D 23/0807; B65D 23/0821; B65D 23/10; B65D 23/102; B65D 23/12; B65D 2301/20; B65D 2313/00; B65D 2313/02; B65D 2313/04; B65D 2313/10; B65D 2401/00; B65D 2401/10; B65D 2401/15; B65D 2401/20; B65D 2401/25; B65D 2401/30; B65D 2401/60; B65D 25/00; B65D 25/02; B65D 25/04; B65D 25/06; B65D 25/08; B65D 25/10; B65D 25/102; B65D 25/103; B65D 25/107; B65D 25/14; B65D 25/16; B65D 25/18; B65D 25/20; B65D 25/205; B65D 25/22; B65D 25/24; B65D 25/28; B65D 25/2805; B65D 25/32; B65D 25/34; B65D 25/36; B65D 25/40; B65D 25/42; B65D 25/52; B65D 25/54; B65D 25/56; B65D 2501/24777; B65D 2501/24821; B65D 2501/2484; B65D 2517/0014; B65D 2517/0044; B65D 2517/0049; B65D 2517/0052; B65D 2517/0056; B65D 2517/0062; B65D 2519/00019; B65D 2519/00024; B65D 2519/00029; B65D 2519/00034; B65D 2519/00039; B65D 2519/00054; B65D 2519/00059; B65D 2519/00064; B65D 2519/00069; B65D 2519/00074; B65D 2519/00099; B65D 2519/00129; B65D 2519/00134; B65D 2519/00139; B65D 2519/00159; B65D 2519/00164; B65D 2519/00169; B65D 2519/00174; B65D 2519/00184; B65D 2519/00194; B65D 2519/00203; B65D 2519/00268; B65D 2519/00273; B65D 2519/00288; B65D 2519/00293; B65D 2519/00298; B65D 2519/00318; B65D 2519/00323; B65D 2519/00333; B65D 2519/00338; B65D 2519/00343; B65D 2519/00358; B65D 2519/00497; B65D 2519/00502; B65D 2519/00512; B65D 2519/00557; B65D 2519/00562; B65D 2519/00567; B65D 2519/00572; B65D 2519/00587; B65D 2519/00621; B65D 2519/00631; B65D 2519/00641; B65D 2519/00656; B65D 2519/00711; B65D 2519/00796; B65D 2519/00805; B65D 2519/00815; B65D 2519/0082; B65D 2519/0086; B65D 2519/0096; B65D 2519/0098; B65D 2539/003; B65D 2539/006; B65D 2543/00074; B65D 2543/00092; B65D 2543/00148; B65D 2543/00194; B65D 2543/00212; B65D 2543/00222; B65D 2543/00268; B65D 2543/00277; B65D 2543/00296; B65D 2543/00305; B65D 2543/00351; B65D 2543/00407; B65D 2543/00416; B65D 2543/00444; B65D 2543/0049; B65D 2543/00518; B65D 2543/00527; B65D 2543/00537; B65D 2543/00546; B65D 2543/00638; B65D 2543/00685; B65D 2543/00731; B65D 2543/0074; B65D 2543/00796; B65D 2543/00842; B65D 2543/00851; B65D 2543/00972; B65D 2565/384; B65D 2565/385; B65D 2565/387; B65D 2571/00018; B65D 2571/00024; B65D 2571/00037; B65D 2571/00043; B65D 2571/00055; B65D 2571/00111; B65D 2571/00117; B65D 2571/00141; B65D 2571/00154; B65D 2571/0016; B65D 2571/00265; B65D 2571/00283; B65D 2571/0029; B65D 2571/00302; B65D 2571/0032; B65D 2571/0045; B65D 2571/00487; B65D 2571/00524; B65D 2571/00561; B65D 2571/00567; B65D 2571/00574; B65D 2571/0066; B65D 2571/00666; B65D 2571/00672; B65D 2571/00716; B65D 2571/00728; B65D 2571/0079; B65D 2571/00796; B65D 2571/00919; B65D 2575/3227; B65D 2575/3236; B65D 2575/3245; B65D 2575/3263; B65D 2575/3272; B65D 2575/3281; B65D 2575/362; B65D 2575/367; B65D 2575/565; B65D

2575/586; B65D 2577/043; B65D 2577/045; B65D 2577/205; B65D 2577/2066; B65D 2577/2083; B65D 2577/2091; B65D 2581/053; B65D 2581/055; B65D 2581/34; B65D 2581/3405; B65D 2581/3406; B65D 2581/341; B65D 2581/3412; B65D 2581/3413; B65D 2581/3416; B65D 2581/3431; B65D 2581/3441; B65D 2581/3444; B65D 2581/3454; B65D 2581/3455; B65D 2581/3456; B65D 2581/3458; B65D 2581/346; B65D 2581/3464; B65D 2581/3466; B65D 2581/3467; B65D 2581/3472; B65D 2581/3474; B65D 2581/3477; B65D 2581/3478; B65D 2581/3479; B65D 2581/3483; B65D 2581/3487; B65D 2581/3489; B65D 2581/3494; B65D 2581/3495; B65D 2581/3497; B65D 2581/3498; B65D 2583/0409; B65D 2583/0413; B65D 2583/0418; B65D 2585/366; B65D 2585/649; B65D 2585/6835; B65D 2585/6837; B65D 2585/6882; B65D 2585/86; B65D 2590/043; B65D 27/00; B65D 27/02; B65D 27/06; B65D 27/14; B65D 27/16; B65D 3/04; B65D 3/06; B65D 3/14; B65D 3/22; B65D 3/28; B65D 31/00; B65D 31/02; B65D 31/04; B65D 31/10; B65D 31/12; B65D 31/16; B65D 31/18; B65D 33/00; B65D 33/001; B65D 33/004; B65D 33/008; B65D 33/01; B65D 33/02; B65D 33/06; B65D 33/105; B65D 33/14; B65D 33/18; B65D 33/20; B65D 33/25; B65D 33/2508; B65D 33/2533; B65D 33/2541; B65D 33/2575; B65D 33/2583; B65D 33/34; B65D 35/02; B65D 35/04; B65D 35/08; B65D 35/10; B65D 35/14; B65D 35/24; B65D 37/00; B65D 39/00; B65D 39/0023; B65D 39/0035; B65D 39/0076; B65D 39/084; B65D 41/04; B65D 41/0414; B65D 41/0421; B65D 41/0428; B65D 41/06; B65D 41/20; B65D 41/28; B65D 41/325; B65D 41/34; B65D 41/3409; B65D 41/3414; B65D 41/3447; B65D 41/56; B65D 43/00; B65D 43/02; B65D 43/0212; B65D 43/022; B65D 43/0222; B65D 43/0231; B65D 43/0235; B65D 43/12; B65D 43/16; B65D 43/162; B65D 43/163; B65D 43/164; B65D 43/22; B65D 47/043; B65D 47/06; B65D 47/0842; B65D 47/121; B65D 47/20; B65D 47/2018; B65D 47/2031; B65D 47/248; B65D 47/32; B65D 47/36; B65D 5/00; B65D 5/0005; B65D 5/001; B65D 5/0015; B65D 5/002; B65D 5/003; B65D 5/0035; B65D 5/0045; B65D 5/008; B65D 5/0085; B65D 5/009; B65D 5/02; B65D 5/0209; B65D 5/0227; B65D 5/0236; B65D 5/0245; B65D 5/0254; B65D 5/0281; B65D 5/029; B65D 5/06; B65D 5/061; B65D 5/064; B65D 5/065; B65D 5/08; B65D 5/10; B65D 5/12; B65D 5/16; B65D 5/2009; B65D 5/2033; B65D 5/2057; B65D 5/209; B65D 5/22; B65D 5/24; B65D 5/241; B65D 5/28; B65D 5/30; B65D 5/32; B65D 5/321; B65D 5/324; B65D 5/326; B65D 5/328; B65D 5/36; B65D 5/3614; B65D 5/3621; B65D 5/38; B65D 5/42; B65D 5/4204; B65D 5/4208; B65D 5/422; B65D 5/4233; B65D 5/4266; B65D 5/4275; B65D 5/4279; B65D 5/4291; B65D 5/4295; B65D 5/443; B65D 5/445; B65D 5/46; B65D 5/46016; B65D 5/46024; B65D 5/46072; B65D 5/4608; B65D 5/46104; B65D 5/46128; B65D 5/46136; B65D 5/46192; B65D 5/48; B65D 5/48002; B65D 5/48008; B65D 5/48014; B65D 5/48016; B65D 5/48018; B65D 5/48022; B65D 5/48024; B65D 5/48026; B65D 5/48028; B65D 5/4803; B65D 5/48032; B65D 5/48034; B65D 5/48038; B65D 5/4804; B65D 5/48042; B65D 5/48046; B65D 5/48048; B65D 5/50; B65D 5/5002; B65D 5/5007; B65D 5/5014; B65D 5/5016; B65D 5/5019; B65D 5/5021; B65D 5/5023; B65D 5/5028; B65D 5/503; B65D 5/5035; B65D 5/5038; B65D 5/504; B65D 5/5045; B65D 5/5047; B65D 5/505; B65D 5/5052; B65D 5/5059; B65D 5/5061; B65D 5/5069; B65D 5/5071; B65D 5/508; B65D 5/5088; B65D 5/509; B65D 5/52; B65D 5/5286; B65D 5/54; B65D 5/5405; B65D 5/541; B65D 5/542; B65D 5/5425; B65D 5/5445; B65D 5/545; B65D 5/5455; B65D 5/56; B65D 5/563; B65D 5/566; B65D 5/60; B65D 5/606; B65D 5/62; B65D 5/64; B65D 5/66; B65D 5/6602; B65D 5/662; B65D 5/6623; B65D 5/6626; B65D 5/6632; B65D 5/6655; B65D 5/6658; B65D 5/6661; B65D 5/6664; B65D 5/667; B65D 5/68; B65D 5/724; B65D 5/725; B65D 5/728; B65D 5/74; B65D 5/746; B65D 5/747; B65D 5/748; B65D 5/749; B65D 50/00; B65D 51/00; B65D 51/002; B65D 51/1616; B65D 51/1644; B65D 51/20; B65D 51/22; B65D 51/24; B65D 51/245; B65D 51/246; B65D 51/248; B65D 51/26; B65D 51/28; B65D 51/2807; B65D 51/2828; B65D 51/2835; B65D 51/2864; B65D 51/2885; B65D 51/2892; B65D 51/30; B65D 53/00; B65D 55/02; B65D 55/024; B65D 55/06; B65D 57/003; B65D 59/04; B65D 61/00; B65D 63/10; B65D 65/00; B65D 65/02; B65D 65/14; B65D 65/22; B65D 65/38; B65D 65/40; B65D 65/403; B65D 65/406; B65D 65/42; B65D 65/44; B65D 65/46; B65D 65/463; B65D 65/466; B65D 7/00; B65D 7/24; B65D 71/00; B65D 71/0085; B65D 71/0092; B65D 71/0096; B65D 71/04; B65D 71/063; B65D 71/08; B65D 71/10; B65D 71/16; B65D 71/18; B65D 71/36; B65D 71/38; B65D 71/40; B65D 71/50; B65D 71/70; B65D 73/0014; B65D 73/0028; B65D

73/0035; B65D 73/0064; B65D 73/0071; B65D 73/0092; B65D 75/00; B65D 75/002; B65D 75/004; B65D 75/008; B65D 75/04; B65D 75/06; B65D 75/12; B65D 75/14; B65D 75/20; B65D 75/22; B65D 75/24; B65D 75/26; B65D 75/28; B65D 75/30; B65D 75/305; B65D 75/32; B65D 75/322; B65D 75/325; B65D 75/326; B65D 75/327; B65D 75/328; B65D 75/36; B65D 75/366; B65D 75/367; B65D 75/38; B65D 75/42; B65D 75/46; B65D 75/48; B65D 75/50; B65D 75/52; B65D 75/522; B65D 75/525; B65D 75/527; B65D 75/54; B65D 75/56; B65D 75/563; B65D 75/566; B65D 75/58; B65D 75/5805; B65D 75/5811; B65D 75/5816; B65D 75/5822; B65D 75/5827; B65D 75/5833; B65D 75/5838; B65D 75/5844; B65D 75/585; B65D 75/5855; B65D 75/5861; B65D 75/5866; B65D 75/5872; B65D 75/5877; B65D 75/5883; B65D 75/5888; B65D 75/5894; B65D 77/003; B65D 77/006; B65D 77/02; B65D 77/04; B65D 77/0413; B65D 77/042; B65D 77/0426; B65D 77/0433; B65D 77/048; B65D 77/0486; B65D 77/06; B65D 77/062; B65D 77/065; B65D 77/067; B65D 77/08; B65D 77/20; B65D 77/2024; B65D 77/2052; B65D 77/22; B65D 77/225; B65D 77/24; B65D 77/245; B65D 77/26; B65D 77/28; B65D 77/30; B65D 77/38; B65D 79/0084; B65D 79/02; B65D 81/00; B65D 81/02; B65D 81/022; B65D 81/025; B65D 81/027; B65D 81/03; B65D 81/05; B65D 81/051; B65D 81/052; B65D 81/053; B65D 81/054; B65D 81/055; B65D 81/056; B65D 81/057; B65D 81/058; B65D 81/075; B65D 81/09; B65D 81/107; B65D 81/1075; B65D 81/113; B65D 81/127; B65D 81/1275; B65D 81/133; B65D 81/18; B65D 81/20; B65D 81/2015; B65D 81/2023; B65D 81/2076; B65D 81/2084; B65D 81/22; B65D 81/24; B65D 81/263; B65D 81/264; B65D 81/266; B65D 81/267; B65D 81/268; B65D 81/28; B65D 81/32; B65D 81/3205; B65D 81/3211; B65D 81/3216; B65D 81/3261; B65D 81/3266; B65D 81/3272; B65D 81/3288; B65D 81/3294; B65D 81/34; B65D 81/3415; B65D 81/343; B65D 81/3438; B65D 81/3446; B65D 81/3453; B65D 81/3461; B65D 81/3476; B65D 81/3484; B65D 81/36; B65D 81/361; B65D 81/365; B65D 81/38; B65D 81/3816; B65D 81/3823; B65D 81/3825; B65D 81/3827; B65D 81/3834; B65D 81/3848; B65D 81/3858; B65D 81/3862; B65D 81/3872; B65D 81/3874; B65D 81/3876; B65D 81/3888; B65D 81/3893; B65D 81/3895; B65D 81/3897; B65D 83/00; B65D 83/0094; B65D 83/04; B65D 83/0463; B65D 83/0472; B65D 83/06; B65D 83/08; B65D 83/0805; B65D 83/0835; B65D 83/0858; B65D 83/20; B65D 83/763; B65D 83/766; B65D 83/771; B65D 83/7713; B65D 85/00; B65D 85/04; B65D 85/07; B65D 85/10; B65D 85/1009; B65D 85/1027; B65D 85/1036; B65D 85/1045; B65D 85/1081; B65D 85/18; B65D 85/20; B65D 85/30; B65D 85/302; B65D 85/321; B65D 85/324; B65D 85/327; B65D 85/328; B65D 85/34; B65D 85/36; B65D 85/38; B65D 85/42; B65D 85/44; B65D 85/46; B65D 85/48; B65D 85/50; B65D 85/505; B65D 85/52; B65D 85/542; B65D 85/544; B65D 85/548; B65D 85/60; B65D 85/62; B65D 85/66; B65D 85/672; B65D 85/68; B65D 85/70; B65D 85/72; B65D 85/76; B65D 85/78; B65D 85/8043; B65D 85/808; B65D 85/812; B65D 85/816; B65D 85/82; B65D 85/84; B65D 88/00; B65D 88/14; B65D 88/524; B65D 88/526; B65D 88/528; B65D 9/12; B65D 9/14; B65D 90/00; B65D 90/023; B65D 90/046; B65D 90/06; B65D 90/08; B65D 90/18; B65B 23/04

USPC ....... 206/521.2, 0.5, 0.8, 1.5, 102, 139, 141, 206/144, 145, 149, 150, 155, 162, 167, 206/173, 175, 18, 191, 192, 193, 194, 206/196, 199, 203, 204, 205, 209, 214, 206/216, 217, 218, 219, 220, 221, 222, 206/223, 225, 226, 229, 232, 233, 245, 206/254, 256, 264, 265, 273, 274, 277, 206/299, 301, 303, 305, 306, 307, 308.1, 206/308.3, 309, 310, 311, 312, 313, 206/315.1, 315.3, 315.5, 316.2, 320, 321, 206/322, 325, 326, 338, 349, 361, 363, 206/364, 365, 366, 37, 370, 372, 373, 206/379, 38, 386, 387.1, 387.13, 389, 206/390, 392, 395, 409, 411, 417, 418, 206/419, 421, 422, 423, 424, 425, 426, 206/427, 432, 433, 434, 438, 439, 440, 206/441, 443, 445, 446, 447, 448, 449, 206/45.25, 45.28, 45.29, 45.3, 450, 451, 206/453, 454, 455, 456, 457, 458, 459.1, 206/459.5, 460, 461, 462, 464, 466, 467, 206/468, 469, 470, 471, 472, 473, 477, 206/478, 482, 484, 484.2, 485, 486, 490, 206/493, 494, 495, 496, 497, 499, 5, 503, 206/505, 506, 507, 508, 509, 511, 512, 206/514, 515, 517, 518, 519, 520, 521, 206/521.1, 521.15, 521.3, 521.4, 521.6, 206/521.7, 521.8, 521.9, 522, 523, 524, 206/524.1, 524.2, 524.3, 524.4, 524.6, 206/524.7, 524.8, 524.9, 525, 526, 527, 206/528, 530, 531, 532, 534, 534.1, 536, 206/537, 538, 539, 540, 541, 546, 548, 206/551, 554, 555, 557, 558, 560, 561, 206/562, 564, 565, 568, 569, 570, 571, 206/572, 573, 575, 576, 577, 581, 583, 206/584, 585, 586, 587, 588, 589, 590, 206/591, 592, 593, 594, 597, 599, 6.1, 206/600, 63.3, 63.5, 701, 706, 709, 710, 206/714, 718, 719, 721, 722, 723, 724, 206/730, 736, 738, 739, 743, 745, 754, 206/755, 756, 757, 758, 760, 761, 763,

206/764, 766, 767, 768, 769, 770, 772, 206/774, 775, 776, 777, 778, 779, 782, 206/783, 784, 803, 804, 805, 806, 807, 206/812, 813, 814, 815, 819, 820, 821, 206/822, 823, 824, 828, 83.5, 830, 831, 206/832, 96; 220/1.5, 200, 203.08, 212, 220/214, 229, 23.4, 23.6, 23.8, 23.83, 220/23.89, 23.9, 238, 240, 254.1, 254.3, 220/254.6, 255.1, 257.2, 258.1, 258.2, 220/258.3, 258.4, 258.5, 259.1, 259.2, 220/259.3, 263, 265, 266, 268, 269, 270, 220/276, 277, 278, 284, 287, 288, 293, 220/296, 304, 324, 345.2, 359.1, 359.3, 220/361, 367.1, 371, 375, 377, 378, 4.01, 220/4.03, 4.07, 4.21, 4.22, 4.23, 4.24, 220/4.26, 4.28, 4.33, 4.34, 480, 483, 485, 220/495, 495.01, 495.03, 495.04, 495.06, 220/500, 506, 507, 508, 509, 510, 512, 220/516, 520, 521, 522, 523, 524, 526, 220/527, 528, 529, 530, 531, 532, 533, 220/534, 540, 553, 555, 556, 560.02, 220/560.03, 567.2, 573.1, 573.3, 573.4, 220/574, 575, 592.11, 592.16, 592.17, 220/592.2, 592.25, 592.27, 6, 601, 602, 220/604, 607, 608, 615, 617, 619, 62, 220/62.1, 62.11, 62.12, 62.15, 62.19, 220/62.2, 62.22, 621, 633, 643, 645, 646, 220/651, 652, 653, 656, 657, 658, 659, 220/660, 662, 665, 666, 669, 670, 671, 220/673, 675, 676, 677, 678, 681, 682, 220/694, 7, 703, 705, 707, 710, 732, 737, 220/743, 752, 754, 758, 771, 782, 784, 220/790, 8, 810, 817, 819, 826, 831, 834, 220/836, 837, 847, 89.2, 890, 9.1, 9.2, 220/9.3, 902, 906, 912, 913, 920, 921, 220/DIG. 12, DIG. 14, DIG. 15, DIG. 27, 220/DIG. 30, DIG. 34, DIG. 9

See application file for complete search history.

(56) References Cited

U.S. PATENT DOCUMENTS

| | | | |
|---|---|---|---|
| 6,105,759 | A | 8/2000 | Fuchs et al. |
| 8,813,965 | B2 | 8/2014 | Cheema et al. |

FOREIGN PATENT DOCUMENTS

| | | | | | |
|---|---|---|---|---|---|
| CN | 211970409 | U | * | 11/2020 | ............. B65D 85/32 |
| CN | 212829675 | U | | 3/2021 | |
| CN | 213200396 | U | | 5/2021 | |
| DE | 29809003 | U1 | * | 7/1998 | ............... B65D 5/06 |
| DE | 29818099 | U1 | | 2/2000 | |
| DE | 202010014415 | | * | 12/2010 | ............. B65D 85/32 |
| DE | 202010014415 | U | * | 12/2010 | ............. B65D 85/32 |
| FR | 2150633 | A1 | | 4/1973 | |
| FR | 2915189 | A1 | | 10/2008 | |
| GB | 0324915 | A | | 2/1930 | |
| GB | 1379751 | A | | 1/1975 | |
| JP | H11321854 | | * | 11/1999 | ............. B65D 85/32 |
| JP | H11321854 | A | * | 11/1999 | ............. B65D 85/32 |
| JP | 2016011133 | | * | 1/2016 | ............. B65D 85/32 |
| JP | 2016011133 | A | * | 1/2016 | ............. B65D 85/32 |
| KR | 200337691 | Y1 | | 1/2004 | |
| KR | 20130011748 | | * | 1/2013 | ............. B65D 1/025 |
| KR | 20130011748 | A | * | 1/2013 | ........... B65D 81/025 |
| WO | WO-2007067804 | | * | 6/2007 | ............. B65D 85/30 |
| WO | WO-2007067804 | A1 | * | 6/2007 | ............. B65D 85/30 |
| WO | WO-2012124854 | | * | 9/2012 | ............... B65D 5/66 |
| WO | WO-2012124854 | A1 | * | 9/2012 | ............... B65D 5/66 |

* cited by examiner

PROTECTIVE PACKAGING FOR ITEMS

TECHNICAL FIELD

This disclosure relates to packaging, including but not limited to protective packaging for fragile goods, such as eggs.

BACKGROUND

Fragile goods often require specialised or bespoke packaging for protection during handling and transit. Such packaging may include, for example, air packaging, bubble wrap, foam packaging, moulded polymer packaging, moulded polystyrene, or polystyrene pieces.

SUMMARY

The present inventors have realised that existing conventional packaging whose shape conforms with that of an object to be packaged, e.g., packaging that is vacuum moulded or injection moulded or thermo-plastically moulded, tends to be difficult or costly to manufacture.

The present inventors have further realised that existing conventional packaging whose purpose is to provide protection to an object therewithin tends to be excessively cumbersome or heavy.

The present inventors have further realised that existing conventional packaging, in particular protective packaging, tends to be environmentally unsustainable to manufacture or dispose of.

The present inventors have realised that some conventional flat-pack packaging is difficult and costly to manufacture, susceptible upon assembly to fatigue and breakage under heavy load, insufficiently thermally insulating upon assembly for many applications, environmentally unsustainable to manufacture or dispose of, or combinations thereof.

The present inventors have therefore recognised that it is desirable to provide flat-pack packaging that is simultaneously cost-effective to manufacture and distribute, sufficiently robust to mitigate the likelihood of packaging fatigue or breakage under load, and sufficiently thermally insulating to improve the longevity of perishable or heat-sensitive goods enclosed therein. It is more desirable still that such packaging be formed entirely of environmentally sustainable materials.

In a first aspect, there is provided protective packaging for packaging an item. The packaging includes a base having an outer base wall and an inner base wall, a plurality of sidewalls extending from the outer base wall whereby to define an internal volume, wherein the plurality of sidewalls define an opening to the internal volume, the opening being opposite to the outer base wall, and the inner base wall is disposed within the internal volume and is spaced apart from the outer base wall, and a cover having an outer cover wall and an inner cover wall. The cover is rotatably attached to a sidewall of the plurality of sidewalls. The cover is rotatable between a closed position in which the cover closes the opening and an open position in which the cover does not close the opening. In the closed position, the inner cover wall is disposed within the internal volume and is spaced apart from the outer cover wall and the inner base wall. The inner base wall includes a first hole for receiving the item. The inner cover wall includes a second hole for receiving the item.

The inner base wall may extend substantially between the plurality of sidewalls.

In the closed position, the inner cover wall may extend substantially between the plurality of sidewalls.

The outer cover wall may include a cut-out or recess along one of its sides.

The protective packaging may further include a first tab extending from the inner base wall, wherein the first tab is fixedly attached to a further sidewall of the plurality of sidewalls.

The protective packaging may further include a second tab extending from the inner cover wall, wherein the second tab is fixedly attached to the sidewall of the plurality of sidewalls.

The first hole may be a substantially circular hole. The second hole may be a substantially circular hole. Both the first hole and the second hole may be a substantially circular hole.

The protective packaging may further include a further cover arranged to be positioned over the cover when the cover is in its closed position, the further cover being rotatably attached to one sidewall of the plurality of sidewalls. The further cover may include a rip-tab.

The protective packaging may be made of one or more materials selected from the group of materials consisting of: a recycled material, a recyclable material, a biodegradable material, paper, card, cardboard (e.g. corrugated cardboard), wood, polymer, and a cellulose fibre material.

The packaging may be an egg box or carton. The item may be an egg.

The base may further include a first tab extending from the inner base wall. The first tab may be fixedly attached to a further sidewall. In its closed position, the inner cover wall may abut the second tab.

The cover may further include a second tab extending from the inner cover wall. The second tab may be fixedly attached to the sidewall. The inner base wall may abut the first tab.

In a further aspect, there is provided a blank for protective packaging for an item. The blank includes a first section, a second section, the second section laterally adjoining the first section and separated from the first section by a first fold line. The blank includes a third section, the third section laterally adjoining the second section at an opposite side of the second section to the first section, and the third section being separated from the second section by a second fold line. The blank includes a fourth section, the fourth section laterally adjoining the third section at an opposite side of the third section to the second section, and the fourth section being separated from the third section by a third fold line. The blank includes a fifth section extending outwardly from the first section, the fifth section being separated from the first section by a fourth fold line. The blank includes a sixth section extending outwardly from the fifth section at a side of the fifth section opposite to the first section, the sixth section being separated from the fifth section by a fifth fold line. The blank includes a seventh section extending outwardly from the sixth section at a side of the sixth section opposite to the fifth section, the seventh section being separated from the sixth section by a sixth fold line. The blank includes an eighth section extending outwardly from the seventh section at a side of the seventh section opposite to the sixth section, the eighth section being separated from the seventh section by a seventh fold line. The blank includes a ninth section extending outwardly from the third section, the ninth section being separated from the third section by an eighth fold line. The blank includes a tenth section extending outwardly from the ninth section at a side of the ninth section opposite to the third section, the tenth section being separated from the ninth section by a ninth fold line. The blank includes an eleventh section extending outwardly from the tenth section at a side of the tenth section opposite to the ninth section, the eleventh section being separated from the tenth section by a tenth fold line. The blank includes a twelfth section extending outwardly from the eleventh section at a side of the eleventh section opposite to the tenth section, the twelfth section being separated from the eleventh section by an eleventh fold line. The seventh section includes a first hole for receiving the item, and the eleventh section includes a second hole for receiving the item.

The fifth section may extend outwardly from the first section at a first side of the blank. The ninth section may extend outwardly from the third section at a second side of the blank, the second side being opposite to the first.

The ninth section may include a cut-out or recess along one of its sides.

The first hole may be a substantially circular hole. The second hole may be a substantially circular hole. Both the first hole and the second hole may be a substantially circular hole.

The blank may further include a thirteenth section extending outwardly from the second section or the fourth section, the thirteenth section being separated from the second section or the fourth section by a twelfth fold line. The thirteenth section may include a rip-tab extending laterally across the thirteenth section.

The blank may be made of one or more materials selected from the group of materials consisting of: a recycled material, a recyclable material, a biodegradable material, paper, card, cardboard, wood, polymer, and a cellulose fibre material.

In a yet further aspect, there is provided a method for assembling packaging from a blank, the blank being in accordance with any preceding aspect. The method includes: fixedly attaching the eighth section to the first section, fixedly attaching the twelfth section to the third section, and folding the blank along the first fold line, the second fold line, and the third fold line such that the first section, the second section, the third section, and the fourth section form a plurality of sidewalls that define an internal volume. The method also includes folding the blank along the fourth fold line, the fifth fold line, the sixth fold line, and the seventh fold line such that the fifth section closes a first opening of the internal volume at a first end of the plurality of sidewalls, and such that the sixth section, the seventh section, and the eighth section are within the internal volume.

The method may be at least partially (e.g., wholly) performed by a machine.

In a yet further aspect, there is provided a method of packaging an item. The method may include performing a method in accordance with the preceding aspect inserting the item into the internal volume via a second opening of the internal volume at a second end of the sidewalls opposite to the first end, wherein the item is received in the first hole of the seventh section and closing the second opening by folding the blank along the eighth fold line, the ninth fold line, the tenth fold line, and the eleventh fold line such that the ninth section closes the second opening of the internal volume at the second end of the sidewalls, and such that the tenth section, the eleventh section, and the twelfth section are within the internal volume, and such that the item is received in the second hole of the eleventh section. The item may be an egg.

In a yet further aspect, there is provided a protective packaging of any preceding aspect formed from the blank of any preceding aspect.

In a yet further aspect, there is provided a protective packaging for packaging an item. The packaging includes a base having an outer base wall and an inner base wall. The packaging further includes a plurality of sidewalls extending from the outer base wall whereby to define an internal volume. The plurality of sidewalls defines an opening to the internal volume, the opening being opposite to the outer base wall. The inner base wall is disposed within the internal volume and is spaced apart from the outer base wall. The packaging further includes a cover having an outer cover wall and an inner cover wall. The cover is rotatably attached to a sidewall of the plurality of sidewalls. The cover is rotatable between a closed position in which the cover closes the opening and an open position in which the cover does not close the opening. In the closed position, the inner cover wall is disposed within the internal volume and is spaced apart from the outer cover wall and the inner base wall. The inner base wall includes a first portion configured to receive or house the item. The inner cover wall includes a second portion configured to receive or house the item.

The base may further include a first tab extending from the inner base wall. The first tab may be fixedly attached to a further sidewall. In the closed position, the inner cover wall may abut the first tab. The cover may further include a second tab extending from the inner cover wall. The second tab may be fixedly attached to the sidewall. The inner base wall may abut the second tab. The inner base wall may extend substantially between the plurality of sidewalls.

In the closed position, the inner cover wall may extend substantially between the plurality of sidewalls.

The outer cover wall may include a cut-out or recess along one of its sides.

The packaging may further include a first tab extending from the inner base wall. The first tab may be fixedly attached to a further sidewall of the plurality of sidewalls.

The packaging may further include a second tab extending from the inner cover wall. The second tab may be fixedly attached to the sidewall of the plurality of sidewalls.

The packaging may further include a further cover arranged to be positioned over the cover when the cover is in its closed position, the further cover being rotatably attached to one of the sidewalls of the plurality of sidewalls.

The packaging may further cover include a rip-tab.

The packaging may further include one or more materials selected from the group of materials consisting of: a recycled material, a recyclable material, a biodegradable material, paper, card, cardboard, wood, polymer, and a cellulose fibre material.

The packaging may be an egg box or carton. The item may be an egg.

Each of the first portion and the second portion may include one or more features selected from the group of features consisting of: a hole, a slit, a depression, an indentation, and a cavity. The one or more features may be one or more structural or physical features, and/or one or more receiving means, and/or one or more housing means.

The first portion may include a first hole for receiving or housing the item. The second portion may include a second hole for receiving or housing the item. One or both of the first hole or the second hole may be a substantially circular hole.

In a yet further aspect, there is provided a blank for protective packaging for an item. The blank includes a first section and a second section, the second section laterally adjoining the first section, and the second section being separated from the first section by a first fold line. The blank further includes a third section laterally adjoining the second section at an opposite side of the second section to the first section, the third section being separated from the second section by a second fold line. The blank further includes a fourth section laterally adjoining the third section at an opposite side of the third section to the second section, the fourth section being separated from the third section by a third fold line. The blank further includes a fifth section extending outwardly from the first section, the fifth section being separated from the first section by a fourth fold line. The blank further includes a sixth section extending outwardly from the fifth section at a side of the fifth section opposite to the first section, the sixth section being separated from the fifth section by a fifth fold line. The blank further includes a seventh section extending outwardly from the sixth section at a side of the sixth section opposite to the fifth section, the seventh section being separated from the sixth section by a sixth fold line. The blank further includes an eighth section extending outwardly from the seventh section at a side of the seventh section opposite to the sixth section, the eighth section being separated from the seventh section by a seventh fold line. The blank further includes a ninth section extending outwardly from the third section, the ninth section being separated from the third section by an eighth fold line. The blank further includes a tenth section extending outwardly from the ninth section at a side of the ninth section opposite to the third section, the tenth section being separated from the ninth section by a ninth fold line. The blank further includes an eleventh section extending outwardly from the tenth section at a side of the tenth section opposite to the ninth section, the eleventh section being separated from the tenth section by a tenth fold line. The blank further includes a twelfth section extending outwardly from the eleventh section at a side of the eleventh section opposite to the tenth section, the twelfth section being separated from the eleventh section by an eleventh fold line. The seventh section includes a first portion configured to receive or house the item. The eleventh section includes a second portion configured to receive or house the item.

The fifth section may extend outwardly from the first section at a first side of the blank. The ninth section may extend outwardly from the third section at a second side of the blank, the second side being opposite to the first.

The ninth section may include a cut-out or recess along one of its sides.

The blank may further include a thirteenth section extending outwardly from the second section or the fourth section, the thirteenth section being separated from the second section or the fourth section by a twelfth fold line. The thirteenth section may include a rip-tab extending laterally across the thirteenth section.

The blank may include one or more materials selected from the group of materials consisting of: a recycled material, a recyclable material, a biodegradable material, paper, card, cardboard, wood, polymer, and a cellulose fibre material.

The first portion may include one or more features selected from the group of features consisting of: a hole, a slit, a depression, an indentation, and a cavity. The second portion may include one or more features selected from the group of features consisting of: a hole, a slit, a depression, an indentation, and a cavity. The one or more features may be one or more structural or physical features, and/or one or more receiving means, and/or one or more housing means.

The first portion may include a first hole for receiving or housing the item. The second portion may include a second hole for receiving or housing the item. One or both of the first hole or the second hole may be a substantially circular hole.

In a yet further aspect, there is provided a method for assembling packaging from a blank, the blank being in accordance with the preceding aspect. The method includes fixedly attaching the eighth section to the first section. The method further includes fixedly attaching the twelfth section to the third section. The method further includes folding the blank along the first, second, and third, fold lines such that the first section, the second section, the third section, and the fourth section form sidewalls that define an internal volume. The method further includes folding the blank along the fourth fold line, the fifth fold line, the sixth fold line, and the seventh fold line such that the fifth section closes a first opening of the internal volume at a first end of the plurality of sidewalls, and such that the sixth section, the seventh section, and the eighth section are within the internal volume. The method may be at least partially performed by a machine.

In a yet further aspect, there is provided a method of packaging an item. The method includes performing the method of the preceding aspect. The method further includes inserting the item into the internal volume via a second opening of the internal volume at a second end of the sidewalls opposite to the first end, wherein the item is received in the first portion of the seventh section. The method further includes closing the second opening by folding the blank along the eighth fold line, the ninth fold line, the tenth fold line, and the eleventh fold line such that the ninth section closes the second opening of the internal volume at the second end of the sidewalls, the tenth section, the eleventh section, and the twelfth section are within the internal volume, and the item is received in the second portion of the eleventh section. The item may be an egg.

In a yet further aspect, there is provided a protective packaging of according to the above aspects, formed from the blank of the above aspects.

Drawing figures are not to scale.

DETAILED DESCRIPTION

It will be appreciated that relative terms such as above and below, horizontal and vertical, top and bottom, front and back, and so on, are used herein merely for ease of reference to the drawings, and these terms are not limiting as such. Any two differing directions or positions and so on may be implemented rather than truly above and below, horizontal and vertical, top and bottom, and so on.

Figure 1:
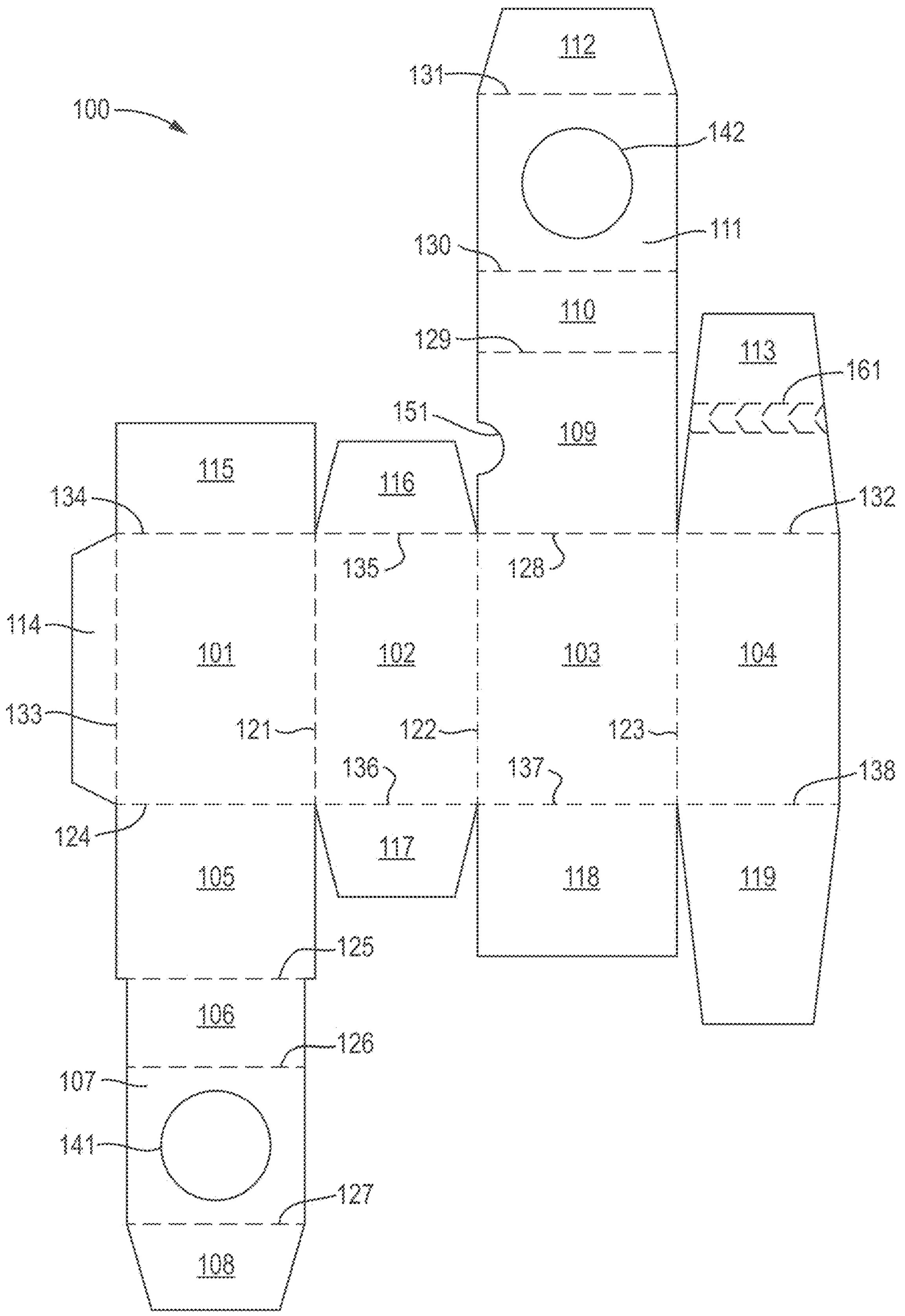
FIG. 1 is a schematic illustration of a blank for protective packaging for an item.

FIG. 1 is a schematic illustration of a blank 100 for protective packaging for an item. The blank 100 has a plurality of sections next to one another.

A central portion of the blank 100 includes four laterally adjoining sections separated by fold lines. More specifically, the blank 100 includes a first section 101, a second section 102, a third section 103, and a fourth section 104. The second section 102 laterally adjoins the first section 101. The second section 102 is separated from the first section 101 by a first fold line 121. The third section 103 laterally adjoins the second section 102 at an opposite side of the second section 102 to the first section 101. The third section 103 is separated from the second section 102 by a second fold line 122. The fourth section 104 laterally adjoins the third section 103 at an opposite side of the third section 103 to the second section 102. The fourth section 104 is separated from the third section 103 by a third fold line 123.

The blank 100 further includes a fifth section 105, a sixth section 106, a seventh section 107, and an eighth section. The fifth section 105 extends outwardly from the first section 101. The fifth section 105 extends outwardly from the first section 101 substantially perpendicularly to the direction in which the second section 102 extends from the first section 101. The fifth section 105 is separated from the first section 101 by a fourth fold line 124. The sixth section 106 extends outwardly from the fifth section 105 at a side of the fifth section 105 opposite to the first section 101. Thus, the fifth section 105 is disposed between the first section 101 and the sixth section 106. The sixth section 106 is separated from the fifth section 105 by a fifth fold line 125. The seventh section 107 extends outwardly from the sixth section 106 at a side of the sixth section 106 opposite to the fifth section 105. Thus, the sixth section 106 is disposed between the fifth section 105 and the seventh section 107. The seventh section 107 is separated from the sixth section 106 by a sixth fold line 126. The eighth section 108 extends outwardly from the seventh section 107 at a side of the seventh section 107 opposite to the sixth section 106. Thus, the seventh section 107 is disposed between the sixth section 106 and the eighth section 108. The eighth section 108 is separated from the seventh section 107 by a seventh fold line 127.

The blank 100 further includes a ninth section 109, a tenth section 110, an eleventh section 111, and a twelfth section 112. The ninth section 109 extends outwardly from the third section 103. The ninth section 109 extends outwardly from the third section 103 substantially perpendicularly to the respective directions in which the second section 102 and the fourth section 104 extend from the third section 103. The ninth section 109 is separated from the third section 103 by an eighth fold line 128. The tenth section 110 extends outwardly from the ninth section 109 at a side of the ninth section 109 opposite to the third section 103. Thus, the ninth section 109 is disposed between the third section 103 and the tenth section 110. The tenth section 110 is separated from the ninth section 109 by a ninth fold line 129. The eleventh section 111 extends outwardly from the tenth section 110 at a side of the tenth section 110 opposite to the ninth section 109. Thus, the tenth section 110 is disposed between the ninth section 109 and the eleventh section 111. The eleventh section 111 is separated from the tenth section 110 by a tenth fold line 130. The twelfth section 112 extends outwardly from the eleventh section 111 at a side of the eleventh section 111 opposite to the tenth section 110. Thus, the eleventh section 111 is disposed between the tenth section 110 and the twelfth section 112. The twelfth section 112 is separated from the eleventh section 111 by an eleventh fold line 131.

In this embodiment, the blank 100 further includes a thirteenth section 113. The thirteenth section 113 may be optional. The thirteenth section 113 extends outwardly from the fourth section 104. The thirteenth section 113 extends outwardly from the fourth section 104 substantially perpendicularly to the direction in which the third section 103 extends from the fourth section 104. The thirteenth section 113 is separated from the fourth section 104 by a twelfth fold line 132.

In this embodiment, the blank 100 further includes a fourteenth section 114, a fifteenth section 115, a sixteenth section 116, a seventeenth section 117, an eighteenth section 118, and a nineteenth section 119. One or more of these sections may be optional. The fourteenth section 114 laterally adjoins the first section 101 at an opposite side of the first section 101 to the second section 102. The fourteenth section 114 is separated from the first section 101 by a thirteenth fold line 133. The fifteenth section 115 extends outwardly from the first section 101 at a side of the first section 101 opposite to the fifth section 105. The fifteenth section 115 extends outwardly from the first section 101 substantially perpendicularly to the direction in which the second section 102 extends from the first section 101. The fifteenth section 115 is separated from the first section 101 by a fourteenth fold line 134. The sixteenth section 116 extends outwardly from the second section 102 substantially perpendicularly to the direction in which the first section 101 and the third section 103 extend from the first section 101. The sixteenth section 116 is separated from the second section 102 by a fifteenth fold line 135. The seventeenth section 117 extends outwardly from the second section 102 at a side of the second section 102 opposite to the sixteenth section 116. The seventeenth section 117 extends outwardly from the second section 102 substantially perpendicularly to the respective directions in which the first section 101 and the third section 103 extend from the second section 102. The seventeenth section 117 is separated from the second section 102 by a sixteenth fold line 136. The eighteenth section 118 extends outwardly from the third section 103 at a side of the third section 103 opposite to the ninth section 109. The eighteenth section 118 extends outwardly from the third section 103 substantially perpendicularly to the respective directions in which the second section 102 and the fourth section 104 extend from the third section 103. The eighteenth section 118 is separated from the third section 103 by a seventeenth fold line 137. The nineteenth section 119 extends outwardly from the fourth section 104 at a side of the fourth section 104 opposite to the thirteenth section 113. The nineteenth section 119 extends outwardly from the fourth section 104 substantially perpendicularly to the direction in which the third section 103 extends from the fourth section 104. The nineteenth section 119 is separated from the fourth section 104 by an eighteenth fold line 138.

In this embodiment, the fifth section 105 extends outwardly from the first section 101 at a first side of the blank 100. Also, the seventeenth section 117 extends outwardly from the second section 102 at the first side of the blank 100. Also, the eighteenth section 118 extends outwardly from the third section 103 at the first side of the blank 100. Also, the nineteenth section 119 extends outwardly from the fourth section 104 at the first side of the blank 100.

In this embodiment, the fifteenth section 115 extends outwardly from the first section 101 at a second side of the blank 100, the second side being opposite to the first side.

Also, the sixteenth section 116 extends outwardly from the second section 102 at the second side of the blank 100. Also, the ninth section 109 extends outwardly from the third section 103 at the second side of the blank 100. Also, the thirteenth section 113 extends outwardly from the fourth section 104 at the second side of the blank 100.

The seventh section 107 includes a first hole 141. The first hole 141 is for receiving an item that is to be packaged in the assembled packaging. In this embodiment, the first hole 141 is substantially circular.

The eleventh section 111 includes a second hole 142. The second hole 142 is for receiving the item that is to be packaged in the assembled packaging. In this embodiment, the second hole 142 is substantially circular.

The ninth section 109 includes a cut-out or recess 151 along one of its sides. This recess 151 is optional.

The thirteenth section 113 includes a rip-tab 161. The rip-tab 161 extends laterally across the thirteenth section 113, i.e.., in a direction perpendicular to the direction in which the thirteenth section 113 extends from the fourth section 104. This rip-tab 161 is optional.

In this embodiment, the first section 101, the second section 102, the third section 103, the fourth section 104, the fifth section 105, the sixth section 106, the seventh section 107, the ninth section 109, the tenth section 110, the eleventh section 111, the fifteenth section 115, and the eighteenth section 118, are substantially rectangular in shape.

In this embodiment, the eighth section 108, the twelfth section 112, the thirteenth section 113, the fourteenth section 114, the sixteenth section 116, the seventeenth section 117, and the nineteenth section 119 are substantially trapezium in shape. The eighth section 108, the twelfth section 112, the thirteenth section 113, the fourteenth section 114, the sixteenth section 116, the seventeenth section 117, and the nineteenth section 119 taper inwardly in a direction away from the blank 100.

In this embodiment, the blank 100 is made of or includes one or more materials selected from the group of materials consisting of: a recycled material, a recyclable material, a biodegradable material, paper, card, cardboard, wood, polymer, and a cellulose fibre material. Preferably, the blank 100 is made of corrugated cardboard.

Figure 2:
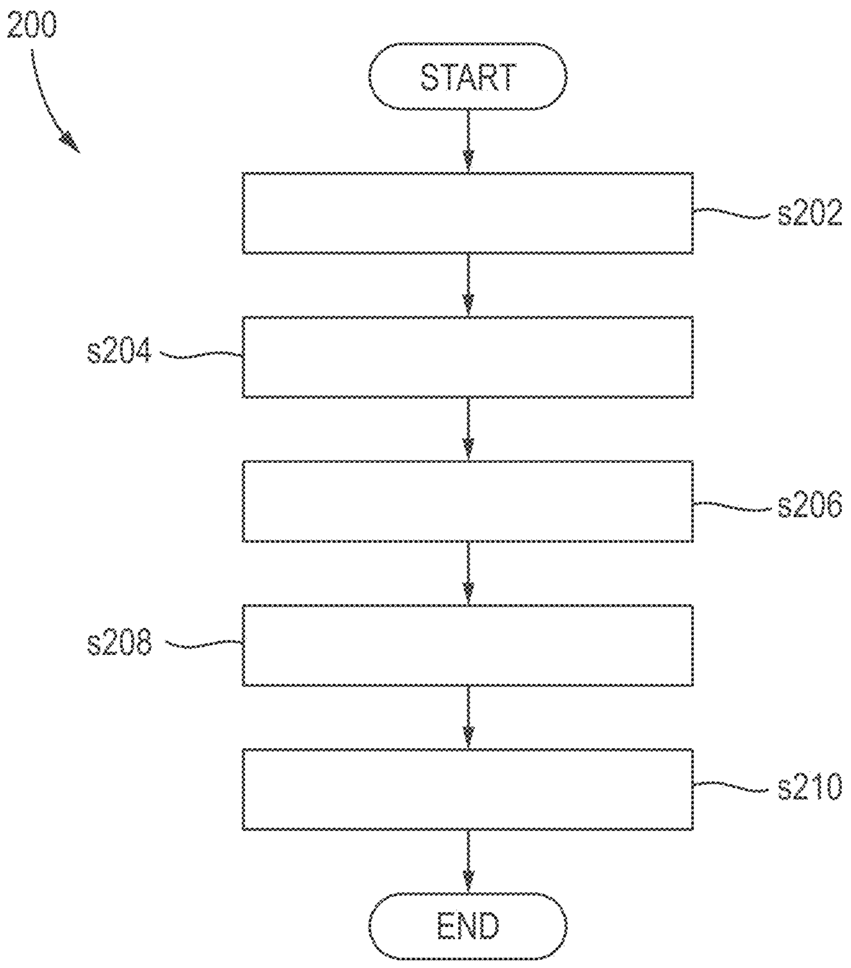
FIG. 2 is a process flow chart showing steps of a method of assembling packaging from the blank.

FIG. 2 is a process flow chart showing steps of a method 200 of assembling packaging from the blank 100.

At step s202, the blank 100 is provided.

At step s204, the eighth section 108 is fixedly attached to the first section 101. This may be achieved using an adhesive or glue. Fixedly attaching the eighth section 108 to the first section 101 includes folding the blank 100 along the fourth fold line 124, the fifth fold line 125, the sixth fold line 126, and the seventh fold line 127. Thus, the eighth section 108 may be considered a glue tab.

At step s206, the twelfth section 112 is fixedly attached to the third section 103. This may be achieved using an adhesive or glue. Fixedly attaching the twelfth section 112 to the third section 103 includes folding the blank 100 along the eighth fold line 128, the ninth fold line 129, the tenth fold line 130, and the eleventh fold line 131. Thus, the twelfth section 112 may be considered a glue tab.

Figure 3:
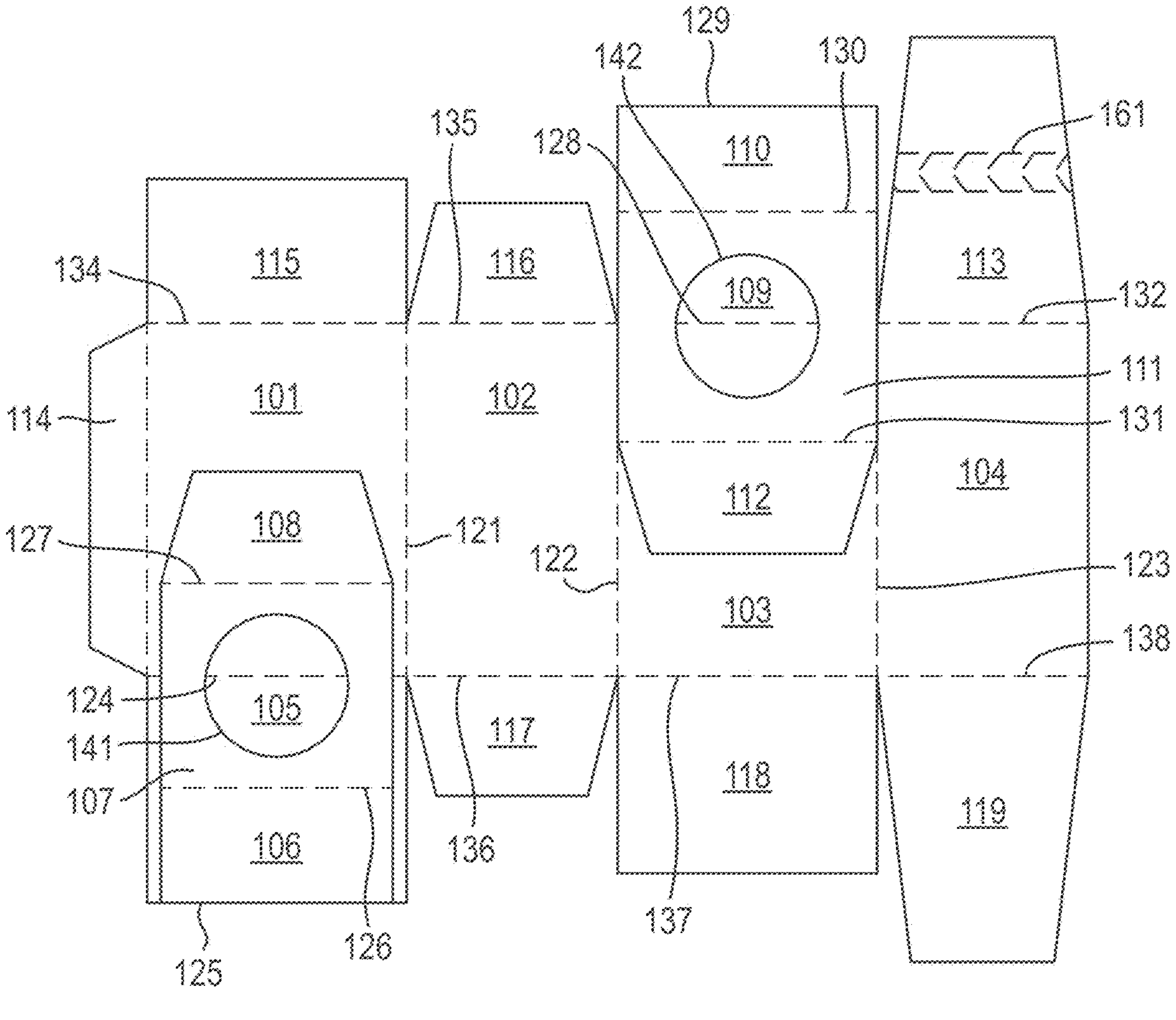
FIG. 3 is a schematic illustration showing part-assembled packaging.

FIG. 3 is a schematic illustration showing the blank 100 that has had the eighth section 108 fixedly attached to the first section 101 and the twelfth section 112 fixedly attached to the third section 103.

At step s208, the fourteenth section 114 is fixedly attached to the fourth section 104. This may be achieved using an adhesive or glue. Thus, the fourteenth section 114 may be considered a glue tab. To do this attachment, the blank 100 may be folded along the second fold line 122 and the thirteenth fold line 133. In some embodiments, the blank may additionally be folded along the first fold line 121 and the third fold line 123, e.g., such that the first section 101, the second section 102, the third section 103, and the fourth section 104 form sidewalls that define an internal volume.

At step s208, the packaging may be in a flat-pack state. The flat-pack packaging is relatively flat, thus facilitating its distribution. Steps s202 to s208 are preferably performed automatically by one or more machines.

The subsequent step of the process of FIG. 2, i.e., step s210, describes packaging erection. Preferably but not necessarily, the packaging erection is performed automatically by a machine, which may be a box erector, a case erector, or a machine erector.

At step s210, the blank 100 is folded along the fourth fold line 124, the fifth fold line 125, the sixth fold line 126, and the seventh fold line 127. This is performed such that the fifth section 105 closes a first opening of the internal volume at a first end of the sidewalls (i.e., the sidewalls being the first section 101, the second section 102, the third section 103, and the fourth section 104). Also, the sixth section 106, the seventh section 107, and the eighth section 108 are within the internal volume. Thus, the protective packaging 400 is assembled or erected in its open position from the blank 100.

Figure 4:
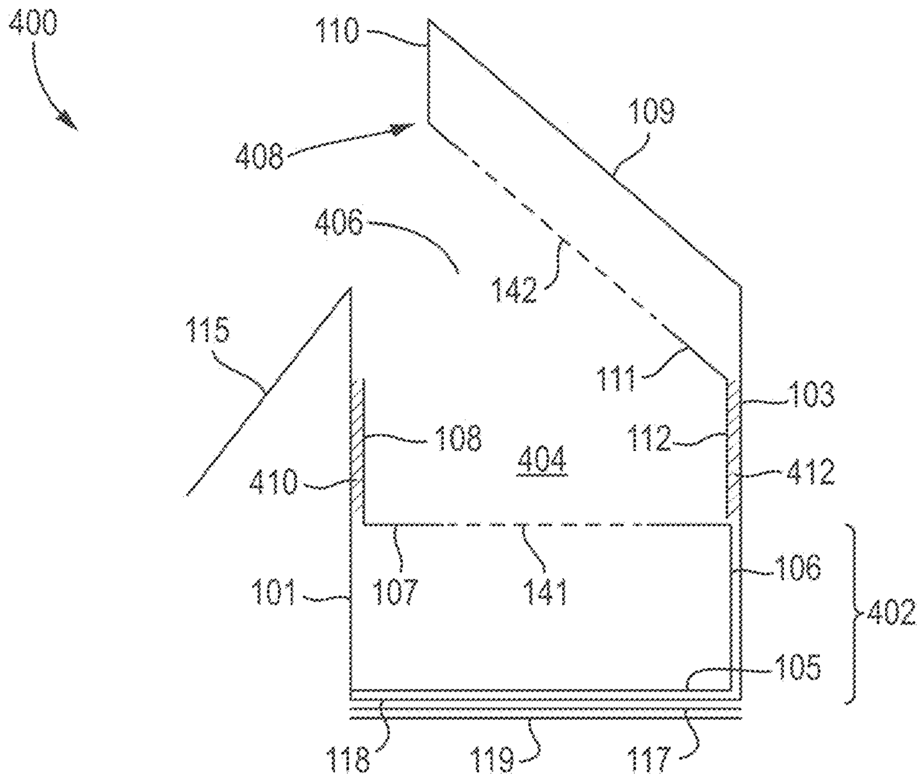
FIG. 4 is a schematic illustration showing a side view cross section of the packaging.

FIG. 4 is a schematic illustration showing a side view cross section of the protective packaging 400 assembled in its open position from the blank 100 by performing the method of FIG. 2.

The protective packaging 400 includes a base 402. The base 402 includes an outer base wall (e.g., the fifth section 105) and an inner base wall) (e.g., the seventh section 107). The packaging 400 further includes a plurality of sidewalls defined by the first section 101, the second section 102, the third section 103, and the fourth section 104, and the sidewalls extend from the outer base wall (e.g., the fifth section 105) whereby to define an internal volume 404. The plurality of sidewalls (i.e., the first section 101, the second section 102, the third section 103, and the fourth section 104) define an opening 406 to the internal volume 404. The opening 406 is opposite to the outer base wall (i.e., the fifth section 105). The inner base wall (i.e., the seventh section 107) is disposed within the internal volume 404 and is spaced apart from the outer base wall (i.e., the fifth section 105) by the sixth section 106). The packaging 400 further includes a cover 408. The cover 408 includes an outer cover wall (which is defined by the ninth section 109) and an inner cover wall) (e.g., the eleventh section 111). The cover 408 is rotatably attached to a third sidewall (e.g., the third section 103) via the eighth fold line 128 and the eleventh fold line 131 about which the blank 100 may bend or fold. The cover 408 is rotatable between a closed position in which the cover 408 closes the opening 406 and an open position in which the cover 408 does not close the opening 406. FIG. 4 shows the packaging 400 in its open position. When the packaging 400 is in its closed position, the inner cover wall (e.g., the eleventh section 111) is disposed within the internal volume 404 and is spaced apart from the outer cover wall (e.g., the ninth section 109) and the inner base wall (e.g., the seventh section 107).

The inner base wall (e.g., the seventh section 107) includes the first hole 141 for receiving an item. The inner cover wall (e.g., the eleventh section 111) includes the second hole 142 for receiving the item.

In this embodiment, the inner base wall (e.g., the seventh section 107) extends substantially between the plurality of sidewalls 101-104. In this embodiment, in the closed position, the inner cover wall (e.g., the eleventh section 111) extends substantially between the plurality of sidewalls 101-104. The outer cover wall (e.g., the ninth section 109) includes the cut-out or recess 151 along one of its sides.

In this embodiment, the packaging 400 includes a first tab) (e.g., the eight section 108). The first tab (e.g., the eight section 108) extends from the inner base wall (e.g., the seventh section 107). The first tab (e.g., the eight section 108) is fixedly attached, e.g., by glue 410, to a first sidewall (e.g., the first section 101).

In this embodiment, the packaging 400 includes a second tab) (e.g., the twelfth section 112). The second tab (e.g., the twelfth section) extends from the inner cover wall (e.g., the eleventh section 111). The second tab (e.g., the twelfth section 112) is fixedly attached, e.g., by glue 412, to the third sidewall (e.g., the third section 103).

The packaging 400 further includes a further cover) (e.g., the thirteenth section). The further cover (e.g., the thirteenth section 113) is arranged to be positioned over the cover 408 when the cover 408 is in its closed position. The further cover (e.g., the thirteenth section 113) is rotatably attached to a fourth sidewall (e.g., the fourth section 104) via the twelfth fold line 132 about which the blank 100 may bend or fold. The further cover (e.g., the thirteenth section 113) includes the rip-tab 161.

Figure 5:
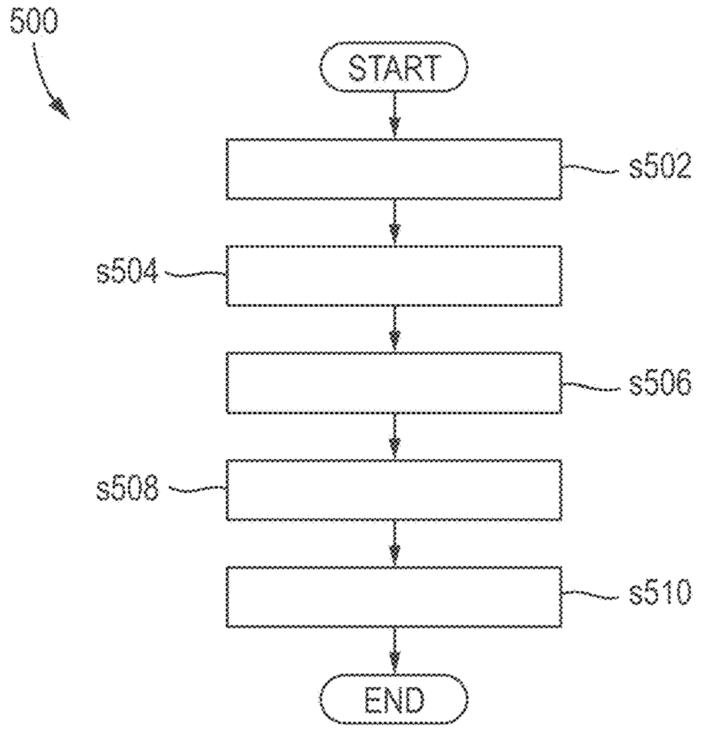
FIG. 5 is a process flow chart showing steps of a method of packaging an item in the packaging.

FIG. 5 is a process flow chart showing steps of a method 500 of packaging an item in the packaging 400 of FIG. 4. In this embodiment, the item is an egg.

The process of FIG. 5 is one of packaging erection and filling. Preferably, the packaging erection is performed automatically by a machine, which may be a box erector, a case erector, or a machine erector.

At step s502, the packaging 400 is provided with the cover 408 in its open position.

At step s504, the item is inserted into the internal volume 404 via the opening 406. This may be performed by a human.

At step s506, the item is received in the first hole 141 of the inner base wall (e.g., the seventh section 107). Thus, the item is securely held in place by the inner base wall (e.g., the seventh section 107).

Figure 6:
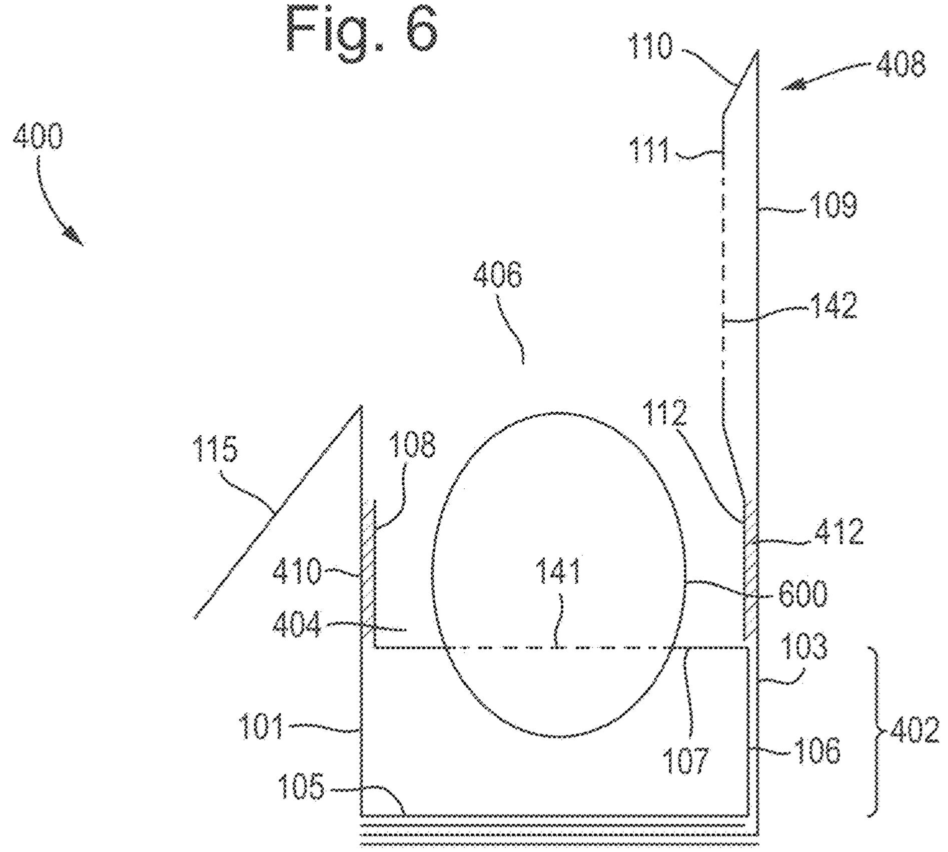
FIG. 6 is a schematic illustration showing the item placed in the packaging.

FIG. 6 is a schematic illustration (not to scale) showing the item 600 placed in the packaging 400 at step s506.

At step s508, the cover 408 is moved into its closed position, thereby to close the opening 406.

In this embodiment, moving the cover 408 into its closed position includes rotating the packaging 400 about the eighth fold line 128, the ninth fold line 129, the tenth fold line 130, and the eleventh fold line 131. The cover 408 is rotated about the eighth fold line 128 and eleventh line 131. Closing the cover 408 includes the outer cover wall (i.e., the ninth section 109) closing the opening 406 of the internal volume 404 at the end of the sidewalls 101-104. With the cover 408 in its closed position, the tenth section 110, the eleventh section 111, and the twelfth section 112 are within the internal volume 404. Also, the item 600 is received in the second hole 142 of the eleventh section 111, i.e., the inner cover wall.

At step s510, the thirteenth section 113 is secured over the outer cover wall (i.e., the ninth section 109). The thirteenth section 113 may be secured using an adhesive, i.e., a glue. The thirteenth section 113 defines a further cover.

Figure 7:
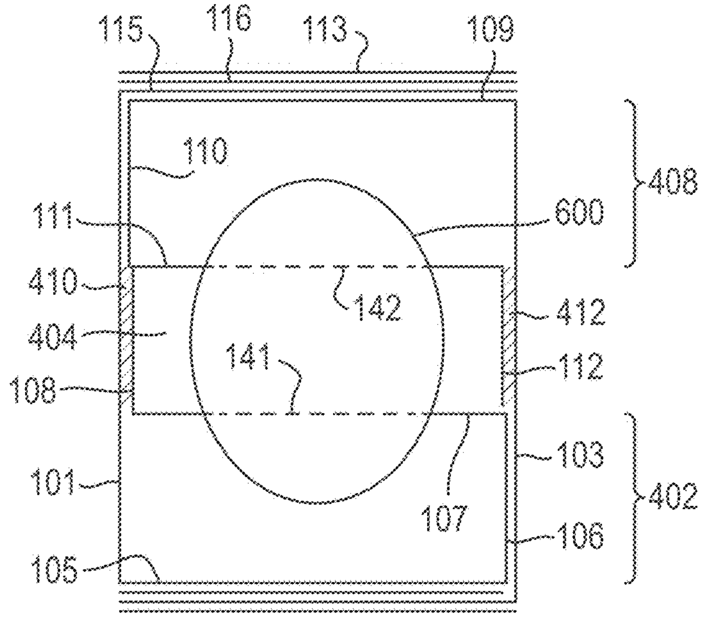
FIG. 7 is a schematic illustration showing the item packaged in the packaging.

FIG. 7 is a schematic illustration showing the item 600 placed in the packaging 400 at step s506.

In the assembled packaging, such as shown in FIG. 7, with the base 402 assembled, or closed, the seventh section 107 (i.e., the inner base wall) abuts, i.e., contacts, the twelfth section 112 (i.e., the glue tab of the cover 408). Thus, when assembling the packaging, the twelfth section 112 may act as a stop or a positioning guide for the seventh section 107, ensuring that the base 402 is correctly assembled. This advantageously tends to facilitate assembly of the packaging by machine erector. Similarly, with the cover 408 closed, the eleventh section 111 (i.e., the cover base wall) abuts, i.e., contacts, the eighth section 108 (i.e., the glue tab of the base 402). Thus, when assembling the packaging, the eighth section 108 may act as a stop or a positioning guide for the eleventh section 111, ensuring that the cover 408 is correctly positioned and fully closed. This advantageously tends to facilitate assembly of the packaging by machine erector. Furthermore, the seventh section 107 abutting the twelfth section 112 and/or the eleventh section 111 abutting the eighth section 108 tends to provide improved rigidity to the assembled packaging. The likelihood of unwanted movement of the base and/or cover tends to be reduced. Thus, improved protection of the item within the packaging tends to be provided.

Thus, the method 500 of packaging the item 600 in the packaging 400 is provided.

The closed packaging 400 may be any appropriate size and may depend on the size of the item to be packaged therein. Preferably, the closed packaging has a length of about 7 cm to about 9 cm, and more preferably about 8 cm to about 8.5 cm. Preferably, the closed packaging has a width of about 5 cm to about 7 cm, and more preferably about 6 cm. Preferably, the closed packaging has a height of about 6.5 cm to about 8.5 cm, and more preferably about 7.5 cm.

To open the packaging, a user may tear the thirteenth section 113 along the rip tab 161, thus allowing access to the cover 408. The user then moves the cover 408 from its closed position to its open position. This is facilitated by the recess 151 into which the user may insert his/her finger to grip the cover 408. With the cover in its open position, the user may remove the item 600 from the packaging.

The above-described packaging may hold an egg in a semi-suspended position. The egg is held away from the packaging outer walls (i.e., the sidewalls, the outer base wall, and the outer cover wall) by the inner base and cover walls. This advantageously tends to protect the egg from damage during transit.

The packaging being made of corrugated cardboard tends to provide relatively soft contact points for the egg. This advantageously tends to protect the egg from damage during transit.

Advantageously, the egg tends to be protected from being crushed, punctured or broken egg during transportation.

The egg is held in the packaging surrounded by air pockets. This tends to provide a degree of thermal insulation for the egg.

Advantageously, the packaging can be assembled by machine, such as by those machines usually used for assembling solid board boxes for medical purposes. Thus, improved packing efficiency for single eggs is provided. For example, the above-described packaging, assembled by machine, may reduce the time for packing single eggs from between 30 seconds to 1 minute per egg to one egg every 2-5 seconds.

In the above embodiments, the protective packaging is for packaging an egg. In other embodiments, the protective packaging is for packaging fragile goods other than an egg. For example, the protective packaging may be used to package food (e.g., fragile confectionary such as chocolate eggs), fragile consumer goods, medical supplies, or construction materials.

In the above embodiments, the packaging is formed of a cellulose fibre material. In other embodiments, the first layer is formed of one or more materials selected from the group of materials consisting of: a recycled material, a recyclable material, a biodegradable material, paper, card, cardboard, wood, polymer, and a cellulose fibre material.

Advantageously, the protective packaging tends to be at least partially recyclable or made at least partially of recycled material. For example, in some embodiments, the entirety of the protective packaging is recyclable. A volume of waste packaging, and thus a volume of non-recyclable waste, tends to be reduced.

In the above embodiments, the fifth section 105, the sixth section 106, the seventh section 107, and the eighth section 108 extend from the first section 101. However, in other embodiments, the fifth section 105, the sixth section 106, the seventh section 107, and the eighth section 108 may extend from a different section other than the first section 101.

In the above embodiments, the fifth section 105, the sixth section 106, the seventh section 107, and the eighth section 108 may extend from the first section 101 at the first side of the blank 100. However, in other embodiments, the fifth section 105, the sixth section 106, the seventh section 107, and the eighth section 108 may extend from the blank at the second side of the blank.

In the above embodiments, the ninth section 109, the tenth section 110, the eleventh section 111, and the twelfth section 112 may extend from the third section 103. However, in other embodiments, the ninth section 109, the tenth section 110, the eleventh section 111, and the twelfth section 112 may extend from a different section other than the third section.

In the above embodiments, the ninth section 109, the tenth section 110, the eleventh section 111, and the twelfth section 112 may extend from the third section 103 at the second side of the blank 100. However, in other embodiments, the ninth section 109, the tenth section 110, the eleventh section 111, and the twelfth section 112 may extend from the blank at the first side of the blank.

In the above embodiments, the thirteenth section 113 extends from the fourth section 104. However, in other embodiments, the thirteenth section extends from a different section other than the fourth section 104, such as the second section 102.

In the above embodiments, the thirteenth section 113 extends from the fourth section 104 at the second side of the blank 100. However, in other embodiments, the thirteenth section 113 extends from the blank at the first side of the blank.

In the above embodiments, the various sections of the blank are separated by fold lines. In some embodiments, on or more of the fold lines is a cut-crease. Preferably, the fourth fold line 124, the fifth fold line 125, the sixth fold line 126, and the seventh fold line 127 may be cut creases. This advantageously tends to facilitate assembly of the base by machine erector. Preferably, the eighth fold line 128, the ninth fold line 129, the tenth fold line 130, and the eleventh fold line 131 may be cut creases. This advantageously tends to facilitate assembly of the cover by machine erector. Preferably, the twelfth fold line 132, the fourteenth fold line 134, the fifteenth fold line 135, and the sixteenth fold line 136 may be cut creases. This advantageously tends to facilitate assembly of the packaging from the blank by machine erector.

In some embodiments, one or more of the sections has a reduced dimension compared to one or more other sections to which it adjoins. For example, referring to FIG. 1, the fifth section 105, the sixth section 106, the seventh section 107, and the eighth section 108 may be shorter in the lateral direction (i.e., horizontally in FIG. 1) than the first section 101. Thus, there may be, for example, gaps, steps, or offsets between the sides of the first section 101 and the sides of the fifth section 105. Also for example, the ninth section 109, the tenth section 110, the eleventh section 111, and the twelfth section 112 may be shorter in the lateral direction (i.e., horizontally in FIG. 1) than the third section 103. Thus, there may be, for example, gaps, steps, or offsets between the sides of the third section 103 and the sides of the ninth section 109. Advantageously, such offsets or steps tend to facilitate assembly of the packaging from the blank by machine erector.

In the above embodiments, the protective packaging is provided with a first hole 141 for receiving the item. The first hole 141 may be considered a portion of the inner base wall (i.e., the seventh section 107) configured to receive or house the item, e.g., in the closed configuration. In the above embodiments, the protective packaging is provided with a second hole 142 for receiving the item. The second hole 142 may be considered a portion of the inner cover wall (i.e., the eleventh section 111) configured to receive or house the item, e.g., in the closed configuration. However, in other embodiments, the inner base wall and/or the inner cover wall may include one or more portions, features, or means for receiving or housing the item instead of or in addition to one or both of the first hole 141 and second hole 142. Examples of such structural features or receiving means or features include but are not limited to one or more slits, one or more depressions, one or more indentations, and/or one or more cavities.

For example, in some embodiments, the protective packaging is, instead of or in addition to the first hole 141 and the second hole 142, provided with respective sets of slits e.g., through the inner base wall and/or the inner cover wall. That is, in some embodiments, instead of or in addition to the first hole 141, the protective packaging may be provided with a first arrangement of one or more slits for receiving the item. Similarly, in some embodiments, instead of or in addition to the second hole 142, the protective packaging is provided with a second arrangement of one or more slits for receiving the item. The first arrangement of one or more slits may form, circumscribe, or be contiguous with, the first hole 141, thereby to provide an area of the protective packaging which is suitable for receiving or housing the item. The first arrangement of one or more slits may be considered to form or be formed in a portion of the inner base wall. The portion of the inner base wall may thus be configured to receive or house the item, e.g., in the closed configuration. The second arrangement of one or more slits may form, circumscribe, or be contiguous with, the second hole 142, thereby to provide an area of the protective packaging which is suitable for receiving or housing the item. The second arrangement of one or more slits may be considered to form or be formed in a portion of the inner cover wall. The portion of the inner cover wall may thus be configured to receive or house the item, e.g., in the closed configuration.

The first and/or second arrangement of one or more slits may be arranged in a cross or star-shaped pattern. The slits of the first arrangement of one or more slits may permit the inner base wall (i.e., the seventh section 107) to be folded thereby to form an aperture, e.g., to form the first hole 141 or an additional or alternative aperture/hole for receiving or housing the item. The slits of the first arrangement of one or more slits may permit the inner base wall (i.e., the seventh section 107) to be folded or deformed thereby to form one or more depressions, one or more indentations, and/or one or more cavities for receiving or housing the item. The slits of the second arrangement of one or more slits may permit the inner cover wall (i.e., the eleventh section 111) to be folded thereby to form an aperture, e.g., to form the second hole 142 or an additional or alternative aperture/hole for receiving or housing the item. The slits of the second arrangement of one or more slits may permit the inner cover wall to be folded or deformed thereby to form one or more depressions, one or more indentations, and/or one or more cavities for receiving or housing the item.

In some embodiments, the protective packaging is provided with a depression, indentation, or cavity in the surface of the inner base wall (i.e., the seventh section 107) in place of, or in addition to, the first hole 141. In some embodiments, the protective packaging is provided with a depression, indentation, or cavity in the surface of the inner cover wall (i.e., the eleventh section 111) in place of, or in addition to, the second hole 142. In some embodiments, the portion of the inner base wall (i.e., the seventh section 107) forms the respective depression, indentation or cavity circumscribes or encompasses the first hole 141. In other embodiments, said portion replaces the first hole 141, thereby to provide an area of the protective packaging that is suitable for receiving or housing the item. In some embodiments, the portion of the inner cover wall (i.e., the eleventh section 111) forms the respective depression, indentation or cavity circumscribes or encompasses the second hole 142. In other embodiments, said portion replaces the second hole 142, thereby to provide an area of the protective packaging that is suitable for receiving or housing the item. Each depression, indentation, or cavity may thus be considered to form, or be formed in, a respective portion of the inner base wall (i.e., the seventh section 107) or the inner cover wall (i.e., the eleventh section 111) configured to receive or house the item, e.g., in the closed configuration.

In the above-described embodiments, the packaging is provided with a pair of portions or receiving means, e.g., holes, and/or arrangements of one or more slits, and/or depressions, indentations, or cavities, thereby to receive or house the item. In other embodiments, the packaging is provided with more than two portions or receiving means, e.g., more than two holes, and/or arrangements of one or more slits, and/or depressions, indentations, or cavities, e.g., to receive multiple items. For example, in some embodiments, the packaging is provided with two pairs of portions or receiving means, or three pairs of portions or receiving means, or four pairs of portions or receiving means, or a greater number of portions or receiving means than four. In some embodiments, each pair of portions or receiving means is configured to receive or house a respective item.

The invention claimed is:

1. Protective packaging for packaging an item, the protective packaging comprising:
- a base comprising:
  - an outer base wall;
  - an inner base wall; and
  - a first tab extending from the inner base wall;
- a plurality of sidewalls extending from the outer base wall whereby to define an internal volume, wherein:
- the plurality of sidewalls defines an opening to the internal volume, and the opening is opposite to the outer base wall; and
- the inner base wall is disposed within the internal volume and is spaced apart from the outer base wall; and
- a cover comprising:
  - an outer cover wall;
  - an inner cover wall; and
  - a second tab extending form the inner cover wall; wherein
- the cover is rotatably attached to a first sidewall of the plurality of sidewalls;
- the cover is rotatable between a closed position in which the cover closes the opening and an open position in which the cover does not close the opening;
- in the closed position, the inner cover wall is disposed within the internal volume and is spaced apart from the outer cover wall and the inner base wall;
- the first tab is fixedly attached to a second sidewall of the plurality of sidewalls;
- in the closed position, the inner cover wall abuts the first tab;
- the second tab is fixedly attached to the first sidewall of the plurality of sidewalls; and
- the inner base wall abuts the second tab;
- the inner base wall comprises a first portion configured to receive or house the item; and
- the inner cover wall comprises a second portion configured to receive or house the item.

2. The protective packaging of claim 1, wherein the inner base wall extends substantially between the plurality of sidewalls.

3. The protective packaging of claim 1, wherein, in the closed position, the inner cover wall extends substantially between the plurality of sidewalls.

4. The protective packaging of claim 1, wherein the outer cover wall comprises a cut-out or recess along one of its sides.

5. The protective packaging of claim 1, further comprising;
- a further cover arranged to be positioned over the cover when the cover is in its closed position, the further cover being rotatably attached to one sidewall of the plurality of sidewalls.

6. The protective packaging of claim 5, wherein the further cover comprises a rip-tab.

7. The protective packaging of claim 1, wherein each of the first portion and the second portion comprises one or more features selected from a group of features consisting of: a hole, a slit, a plurality of slits, a depression, an indentation, and a cavity.

8. The protective packaging of claim 7, wherein:
- the first portion comprises a first hole for receiving or housing the item; and
- the second portion comprises a second hole for receiving or housing the item.

9. A blank for protective packaging for an item, the blank comprising:
- a first section;
- a second section laterally adjoining the first section, wherein the second section is separated from the first section by a first fold line;
- a third section laterally adjoining the second section at an opposite side of the second section to the first section, wherein the third section is separated from the second section by a second fold line;
- a fourth section laterally adjoining the third section at an opposite side of the third section to the second section, wherein the fourth section is separated from the third section by a third fold line;

a fifth section extending outwardly from the first section in a first direction, wherein the fifth section is separated from the first section by a fourth fold line;

a sixth section extending outwardly from the fifth section at a side of the fifth section opposite to the first section, wherein the sixth section is separated from the fifth section by a fifth fold line;

a seventh section extending outwardly from the sixth section at a side of the sixth section opposite to the fifth section, wherein the seventh section is separated from the sixth section by a sixth fold line;

an eighth section extending outwardly from the seventh section at a side of the seventh section opposite to the sixth section, wherein the eighth section is separated from the seventh section by a seventh fold line;

a ninth section extending outwardly from the third section in a second direction, wherein the second direction is opposite the first direction, wherein the ninth section is separated from the third section by an eighth fold line;

a tenth section extending outwardly from the ninth section at a side of the ninth section opposite to the third section, wherein the tenth section is separated from the ninth section by a ninth fold line;

an eleventh section extending outwardly from the tenth section at a side of the tenth section opposite to the ninth section, wherein the eleventh section is separated from the tenth section by a tenth fold line; and a twelfth section extending outwardly from the eleventh section at a side of the eleventh section opposite to the tenth section, wherein the twelfth section is separated from the eleventh section by an eleventh fold line; and wherein the seventh section comprises a first portion configured to receive or house the item; and the eleventh section comprises a second portion configured to receive or house the item.

10. The blank of claim 9, wherein the ninth section comprises a cut-out or recess along one of its sides.

11. The blank of claim 9, further comprising;

a thirteenth section extending outwardly from one of the second section or the fourth section, wherein the thirteenth section is separated from the one of the second section or the fourth section by a twelfth fold line.

12. The blank of claim 11, wherein the thirteenth section comprises a rip-tab extending laterally across the thirteenth section.

13. The blank of claim 9, wherein each of the first portion and the second portion comprises one or more features selected from a group of features consisting of: a hole, a slit, a depression, an indentation, and a cavity.

14. The blank of claim 13, wherein:

the first portion comprises a first hole for receiving or housing the item; and the second portion comprises a second hole for receiving or housing the item.

15. A method for assembling packaging from the blank of claim 9, the method comprising:

fixedly attaching the eighth section to the first section;

fixedly attaching the twelfth section to the third section;

folding the blank along the first fold line, the second fold line, and the third fold line such that the first section, the second section, the third section, and the fourth section form a plurality of sidewalls that define an internal volume; and folding the blank along the fourth fold line, the fifth fold line, the sixth fold line, and the seventh fold line such that the fifth section closes a first opening of the internal volume at a first end of the sidewalls and the sixth section, the seventh section, and the eighth section are within the internal volume.

16. The method of claim 15, wherein the method is at least partially performed by a machine.

* * * * *